(12) United States Patent
Murasawa et al.

(10) Patent No.: US 8,935,439 B2
(45) Date of Patent: Jan. 13, 2015

(54) OIL PRESSURE CONTROL SYSTEM OF AUTOMATIC TRANSMISSION FOR VEHICLE

(71) Applicant: Honda Motor Co., Ltd., Tokyo (JP)

(72) Inventors: Hiroki Murasawa, Wako (JP); Satoru Miyata, Wako (JP); Akihiro Shibahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 60 days.

(21) Appl. No.: 13/754,907

(22) Filed: Jan. 31, 2013

(65) Prior Publication Data

US 2013/0253785 A1 Sep. 26, 2013

(30) Foreign Application Priority Data

Mar. 23, 2012 (JP) ................................ 2012-068072

(51) Int. Cl.
*G06F 3/08* (2006.01)
*G06F 7/00* (2006.01)
*G06F 17/00* (2006.01)

(52) U.S. Cl.
USPC .................... 710/16; 701/53; 701/67; 477/44

(58) Field of Classification Search
USPC ........ 477/45–79, 44; 701/53–67; 475/61–157
See application file for complete search history.

(56) References Cited

U.S. PATENT DOCUMENTS

| | | | | |
|---|---|---|---|---|
| 5,836,845 A | * | 11/1998 | Sakaguchi et al. | 475/131 |
| 5,865,704 A | * | 2/1999 | Takagi et al. | 477/62 |
| 5,906,555 A | * | 5/1999 | Sakaguchi et al. | 475/61 |
| 6,397,703 B1 | * | 6/2002 | Iijima | 74/732.1 |
| 6,612,958 B2 | * | 9/2003 | Imai et al. | 475/210 |
| 8,439,798 B2 | * | 5/2013 | Hanyu et al. | 477/45 |
| 8,498,791 B2 | * | 7/2013 | Muto et al. | 701/67 |
| 8,594,898 B2 | * | 11/2013 | Totsuka | 701/60 |

FOREIGN PATENT DOCUMENTS

JP 2011-196390 10/2011

* cited by examiner

*Primary Examiner* — Man Phan
(74) *Attorney, Agent, or Firm* — Mori & Ward, LLP

(57) ABSTRACT

An oil pressure control system of an automatic transmission for a vehicle includes a lock-up clutch, a TC regulator valve, an LC control valve, an LC shift valve, an oil cooler, a control area determination device, a torque transmission capacity calculator, a high load state determination device, and an oil pressure controller. The oil pressure controller is configured to control a TC regulator pressure outputted by a TC regulator valve, so that a torque transmission capacity of a lock-up clutch is greater than a reference torque transmission capacity calculated by the torque transmission capacity calculator, if a control area determined by the control area determination device is a complete engagement area and the high load state determination device determines that an operational state is in a high load state.

4 Claims, 6 Drawing Sheets

OIL PRESSURE CONTROL SYSTEM OF AUTOMATIC TRANSMISSION FOR VEHICLE

CROSS-REFERENCE TO RELATED APPLICATIONS

The present application claims priority under 35 U.S.C. §119 to Japanese Patent Application No. 2012-068072, filed Mar. 23, 2012, entitled "Oil Pressure Control Device of Automatic Transmission for Vehicle." The contents of this application are incorporated herein by reference in their entirety.

BACKGROUND OF THE INVENTION

1. Field of the Invention

The present disclosure relates to an oil pressure control system of an automatic transmission for a vehicle.

2. Discussion of the Background

Oil which is discharged from an oil pump of a transmission is regulated to a predetermined hydraulic pressure and is supplied to a torque converter, in which the oil is circulated through a pump impeller, a turbine runner, and a stator vane, and is used for torque amplification, engagement/disengagement of a lock-up clutch, and subsequently, is returned to an oil tank as returning oil. Japanese Unexamined Patent Application Publication No. 2011-196390 discloses an oil pressure control device in which an oil cooler is disposed in an oil passage connecting between the torque converter and the oil tank so as to cool the returning oil.

SUMMARY OF THE INVENTION

According to one aspect of the present invention, an oil pressure control system of an automatic transmission for a vehicle includes a lock-up clutch, a TC regulator valve, an LC control valve, an LC shift valve, an oil cooler, a control area determination device, a torque transmission capacity calculator, a high load state determination device, and an oil pressure controller. The lock-up clutch is provided in a torque converter of the automatic transmission. The torque converter includes a first oil chamber and a second oil chamber. The TC regulator valve is to regulate an oil pressure outputted by an oil pump to a TC regulator pressure. The LC control valve is to regulate the TC regulator pressure to an LC pressure. The LC shift valve is to supply the TC regulator pressure and the LC pressure to the torque converter via a first oil passage and a second oil passage. The oil cooler is to cool returning oil which is discharged from the second oil chamber via a third oil passage. The LC shift valve supplies the TC regulator pressure to the first oil chamber via the first oil passage and supplies the returning oil to the oil cooler when the lock-up clutch is disengaged. The LC shift valve supplies the LC pressure to the first oil chamber via the first oil passage, supplies the TC regulator pressure to the second oil chamber via the second oil passage, and supplies the returning oil to the oil cooler when the lock-up clutch slips or is completely engaged. The control area determination device is configured to determine a control area of the lock-up clutch according to an operational state of the vehicle. The torque transmission capacity calculator is configured to calculate a reference torque transmission capacity of the lock-up clutch according to the control area determined by the control area determination device. The high load state determination device is configured to determine that an operational state of the vehicle is in a high load state. The operational state includes an oil temperature of the automatic transmission. The oil pressure controller is configured to control the TC regulator pressure outputted by the TC regulator valve, so that a torque transmission capacity of the lock-up clutch is greater than the reference torque transmission capacity calculated by the torque transmission capacity calculator, if the control area determined by the control area determination device is a complete engagement area and the high load state determination device determines that the operational state is in the high load state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
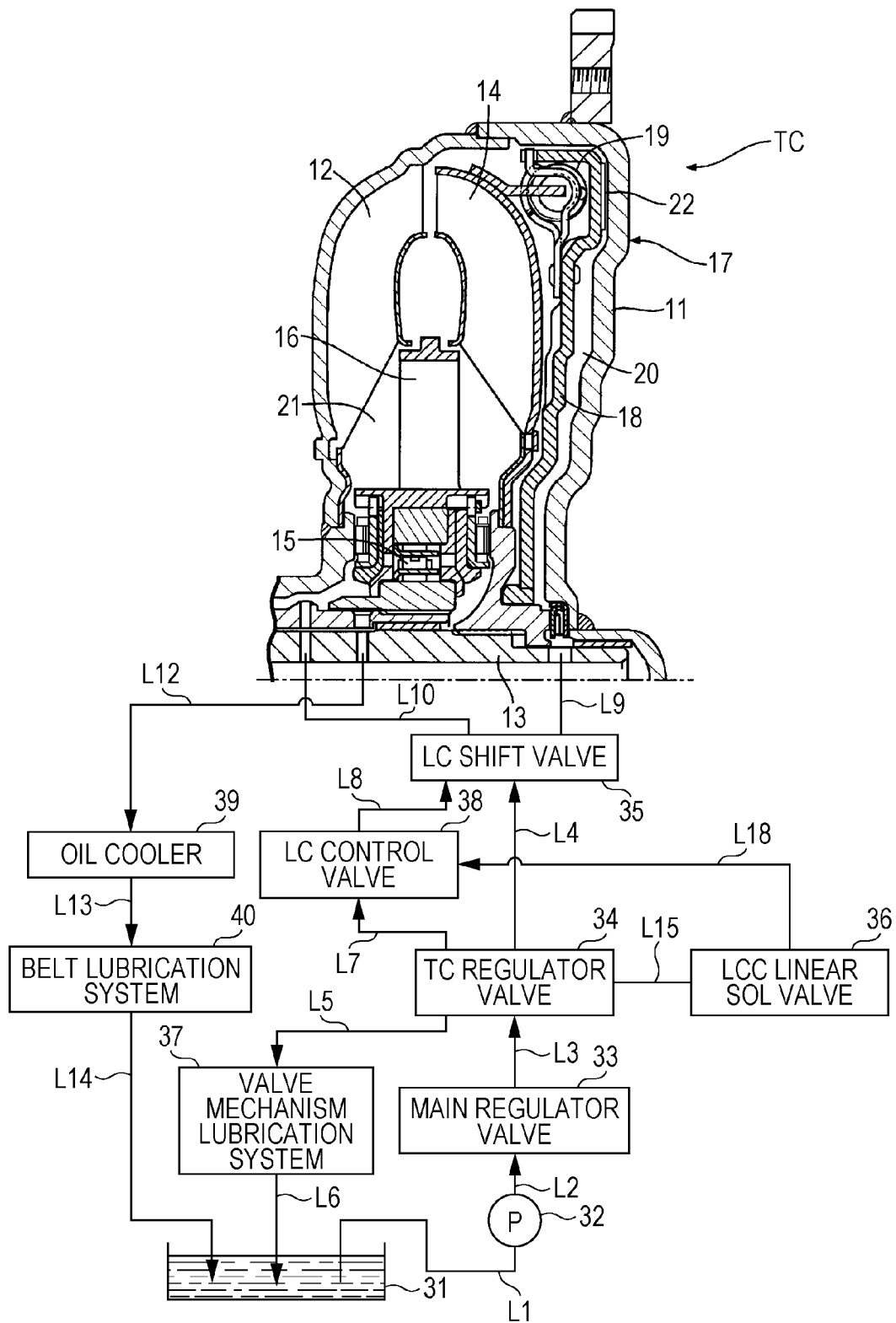
FIG. 1 illustrates an oil pressure circuit diagram of a torque converter.

The embodiments will now be described with reference to the accompanying drawings, wherein like reference numerals designate corresponding or identical elements throughout the various drawings.

Hereinafter, an embodiment of the present disclosure will be described with reference to FIGS. 1 to 6.

As illustrated in FIG. 1, a torque converter TC disposed in a belt-type continuously variable transmission for a vehicle includes a pump impeller 12 which is connected integrally with a torque converter cover 11 which is connected to an engine crankshaft; a turbine runner 14 which is connected integrally with an input shaft 13 of the belt type gearless continuously variable transmission, and faces the pump impeller 12; and a stator vane 16 which is disposed between the pump impeller 12 and the turbine runner 14, and supported by a casing via an one-way clutch 15.

A lock-up clutch 17 is provided between the turbine runner 14 and the torque converter cover 11. The lock-up clutch 17 includes a lock-up piston 18 disposed between the torque converter cover 11 and the turbine runner 14, and a damper spring 19 which interconnects the lock-up piston 18 and the turbine runner 14. The first oil chamber 20 is partitioned on one side of the lock-up piston 18, the torque converter cover 11 being in the side, and the second oil chamber 21 is partitioned on the other side of the lock-up piston 18, the turbine runner 14 being in the other side. When the lock-up piston 18 moves to the right in FIG. 1, a clutch facing 22 comes into contact with the torque converter cover 11, and thus the lock-up clutch 17 is engaged and the engine crankshaft is directly connected to the input shaft 13 of the belt-type continuously variable transmission via the torque converter cover 11, the damper spring 19, and the turbine runner 14.

Oil which is pumped by an oil pump 32 from an oil tank 31 via oil a passage L1 is supplied to a main regulator valve 33 via an oil passage L2, and is regulated to a line pressure. Subsequently, the regulated oil is supplied to a torque converter (TC) regulator valve 34 via an oil passage L3, and is regulated to a TC regulator pressure in the TC regulator valve 34, and is supplied to a lock-up clutch (LC) shift valve 35 via an oil passage L4. The TC regulator valve 34 is regulated to an LCC pressure (lock-up clutch control pressure) which is transmitted from a lock-up clutch control (LCC) linear solenoid valve 36 via an oil passage L15, so that the line pressure is decreased and regulated to the TC regulator pressure. In the above pressure reducing process, excess oil is supplied to a mechanism lubrication system 37 of the belt-type continuously variable transmission via an oil passage L5, and the oil used for lubrication is returned to the oil tank 31 via an oil passage L6. Part of the oil outputted by the TC regulator valve 34 is supplied to an LC control valve 38 via an oil passage L7, and is regulated to the LC pressure in the LC control valve 38 by the LCC pressure which is supplied from the LCC linear solenoid valve 36 via an oil passage L18. Subsequently, the regulated oil is supplied to the LC shift valve 35 via an oil passage L8.

The LC shift valve 35 is connected to the first oil chamber 20 of the torque converter TC via an oil passage L9 (first oil passage), and to the second oil chamber 21 of the torque converter TC via an oil passage L10 (second oil passage). The second oil chamber 21 of the torque converter TC is connected to an oil cooler 39 via an oil passage L12 (third oil passage). Oil is cooled by the oil cooler 39 and is supplied to a belt lubrication system 40 of the belt-type continuously variable transmission via an oil passage L13, and the oil used for lubrication is returned to the oil tank 31 via an oil passage L14.

Figure 2A:
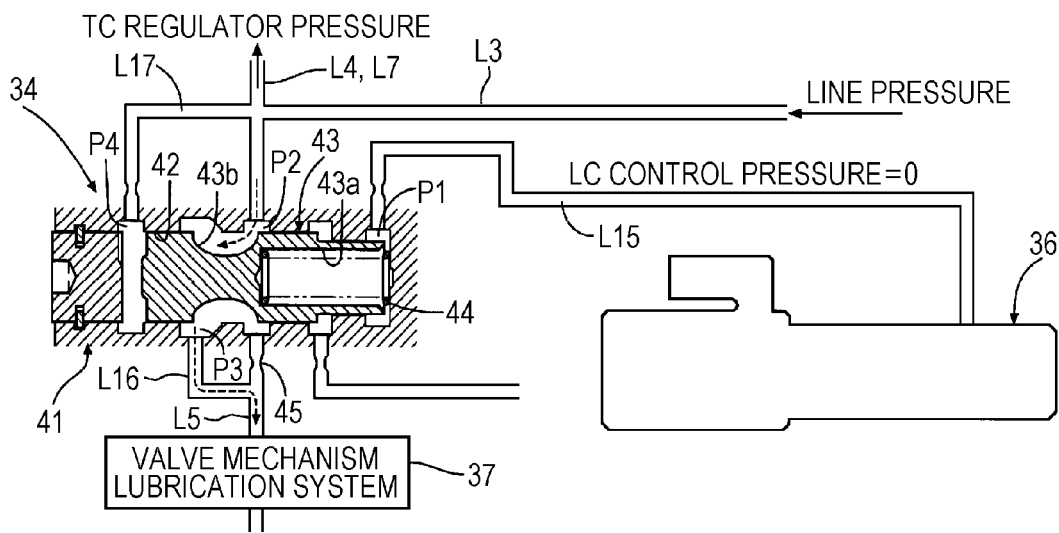
FIGS. 2A and 2B illustrate an oil pressure circuit diagram around the periphery of a TC regulator valve.
Figure 2B:
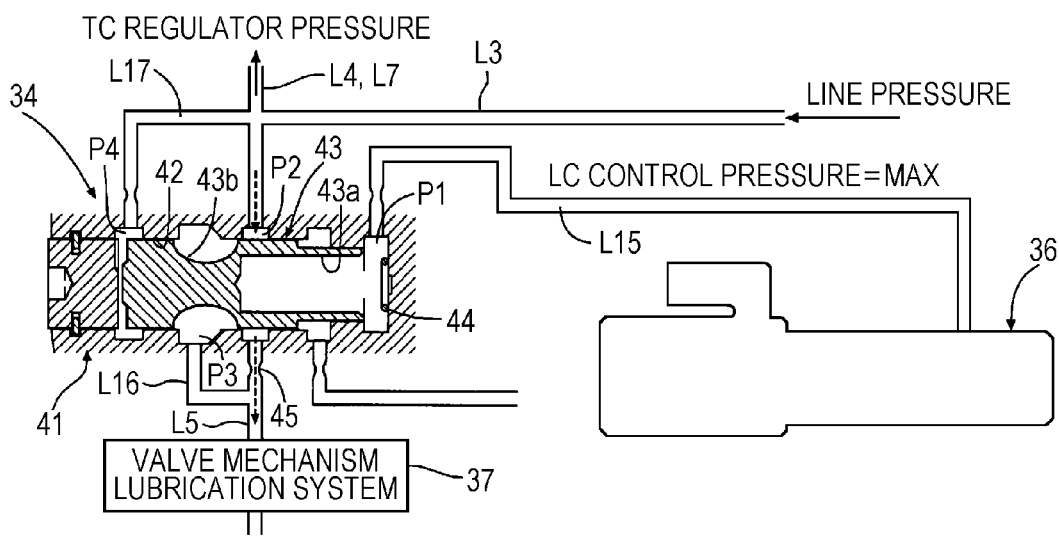

As illustrated in FIGS. 2A and 2B, the TC regulator valve 34 includes a spool 43 which is slidably fitted to a spool hole 42 which is formed in a valve housing 41. The spool 43 is urged to the left by a spring 44 which is fitted to a recessed portion 43a which is open at the right end of the spool 43. Ports P1, P2, P3 and P4 are formed in the spool hole 42. The port P1 communicates with the LCC linear solenoid valve 36 via the oil passage L15; the port P2 communicates with the LC shift valve 35 and the LC control valve 38 via the respective oil passages L4, L7, and communicates with the mechanism lubrication system 37 via the oil passage L5; the port P3 communicates with the oil passage L5 via an oil passage L16; and the port P4 communicates with the oil passages L4, L7 via the oil passage L17.

Figure 5:
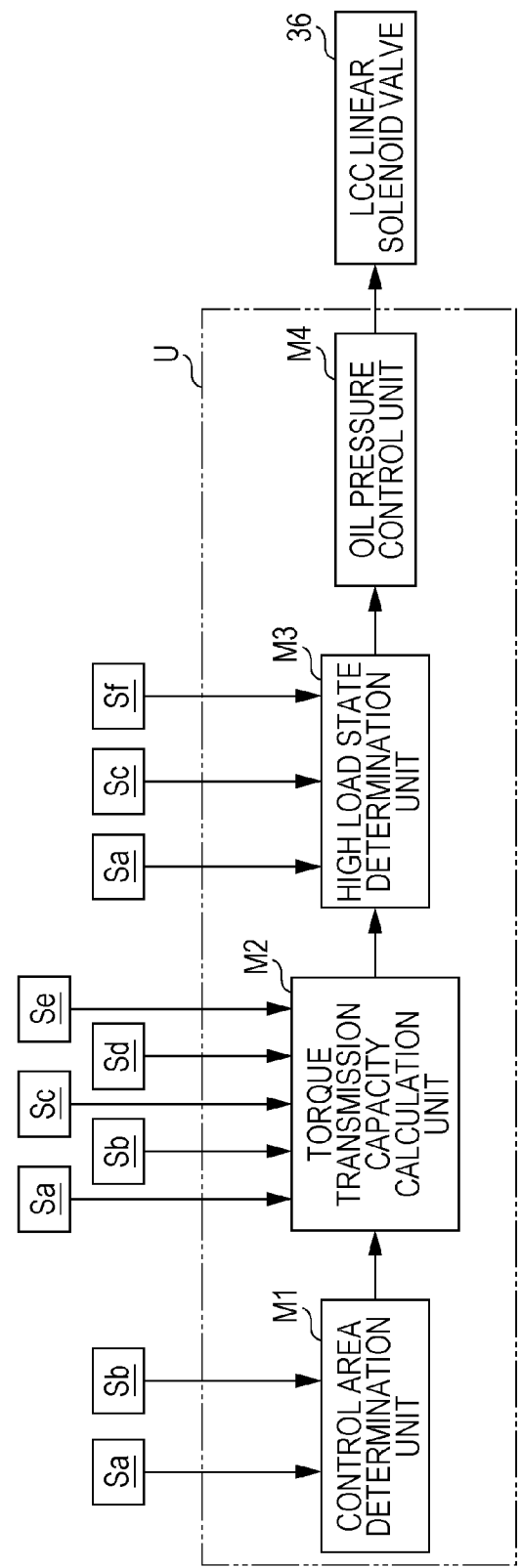
FIG. 5 illustrates a block diagram of the control system of the lock-up clutch.

As illustrated in FIG. 5, an electronic control unit U which controls the LCC linear solenoid valve 36 of the oil circuit of the torque converter TC includes a control area determination unit M1, a torque transmission capacity calculation unit M2, a high load state determination unit M3, and an oil pressure control unit M4. The control area determination unit M1 is connected to a vehicle speed sensor Sa which detects a vehicle speed, and a throttle position sensor Sb which detects a throttle opening. The torque transmission capacity calculation unit M2 is connected to an engine RPM sensor Sc which detects an engine RPM, an intake negative pressure sensor Sd which detects an intake negative pressure, and an input shaft RPM sensor Se which detects an RPM of the input shaft 13 of the belt-type continuously variable transmission, in addition to the vehicle speed sensor Sa and the throttle position sensor Sb. The high load state determination unit M3 is connected to an oil temperature sensor Sf which detects an oil temperature of the belt-type continuously variable transmission, in addition to the vehicle speed sensor Sa and the engine RPM sensor Sc. The electronic control unit U calculates an LCC pressure target value LCCCMD to be outputted by the LCC linear solenoid valve 36 based on an output of each of the sensors Sa to Sf, and the solenoid of the LCC linear solenoid valve 36 is energized based on the LCC pressure target value LCCCMD.

Next, the effect of the embodiment of the present disclosure with the above-described configuration will be described.

First, the overall effect of the lock-up clutch 17 of the torque converter TC will be described. The oil which is pumped from the oil tank 31 by an oil pump 32 driven with an engine is regulated to the line pressure by the main regulator valve 33, and is further regulated to the TC regulator pressure by the TC regulator valve 34. Excess oil in the TC regulator valve 34, while being returned from the oil passage L5 to the oil tank 31 through the mechanism lubrication system 37 and the oil passage L6, lubricates mechanical parts of the belt-type continuously variable transmission.

The LC shift valve 35 switches between pressures to be transmitted to each of the oil passages L9 and L10 according to whether the lock-up clutch 17 is disengaged or engaged. When the lock-up clutch 17 is disengaged, the TC regulator pressure from the TC regulator valve 34 is transmitted to the oil passage L9, whereas the oil passage L10 is blocked. Consequently, oil having the TC regulator pressure is supplied from the oil passage L9 to the first oil chamber 20 of the torque converter TC, and is discharged to the oil tank 31 through the following path: the second oil chamber 21→the oil passage L12→the oil cooler 39→the oil passage L13→the belt lubrication system 40→the oil passage L14. In the above process, the lock-up clutch 17 is disengaged by the oil which flows through the first oil chamber 20, the oil urging the lock-up piston 18 in the direction away from the torque converter cover 11. The oil discharged from the torque converter TC is cooled by the oil cooler 39, and subsequently, cools the metal belt of the belt-type continuously variable transmission while flowing through the belt lubrication system 40.

On the other hand, when the lock-up clutch 17 is engaged, the LC shift valve 35 allows the TC regulator pressure from the TC regulator valve 34 to be transmitted to the oil passage L10, and allows the LC pressure from the LC control valve 38 to be transmitted to the oil passage L9. Consequently, the oil having the TC regulator pressure is supplied from the oil passage L10 to the second fluid chamber 21 of the torque converter TC, and the oil having the LC pressure reduced from the TC regulator pressure is supplied from the oil passage L9 to the first oil chamber 20. The differential between the TC regulator pressure and the LC pressure causes the clutch facing 22 of the lock-up piston 18 to be urged against the torque converter cover 11, and thus the lock-up clutch 17 is engaged. At this point, excess oil in the second oil chamber 21 is discharged to the oil tank 31 through the following path: the oil passage L12→the oil cooler 39→the oil passage L13→the belt lubrication system 40→the oil passage L14. In the above process, the returning oil cooled by the oil cooler 39 cools the metal belt of the belt-type continuously variable transmission while flowing through the belt lubrication system 40.

Now, when the oil temperature of the belt-type continuously variable transmission rises according to an operational state of a vehicle, the oil temperature can be decreased by increasing the flow rate of the oil which flows through the oil cooler 39 as much as possible. However, the oil to be supplied to the oil cooler 39 is the returning oil after controlling the operation of the lock-up clutch 17 of the torque converter TC, and therefore, there is a problem in that when the flow rate of the oil is increased unconditionally, the control lock-up clutch 17 cannot be appropriately controlled. Thus, in the present embodiment, when the control area of the lock-up clutch 17 is in a tight region (complete engagement area), the flow rate of oil to be supplied to the lock-up clutch 17 is increased as much as possible, thereby increasing the flow rate of oil to be supplied to the oil cooler 39 without affecting the control of the lock-up clutch 17.

Hereinafter, the above control will be described with reference to the flowchart of FIG. 3.

Figure 3:
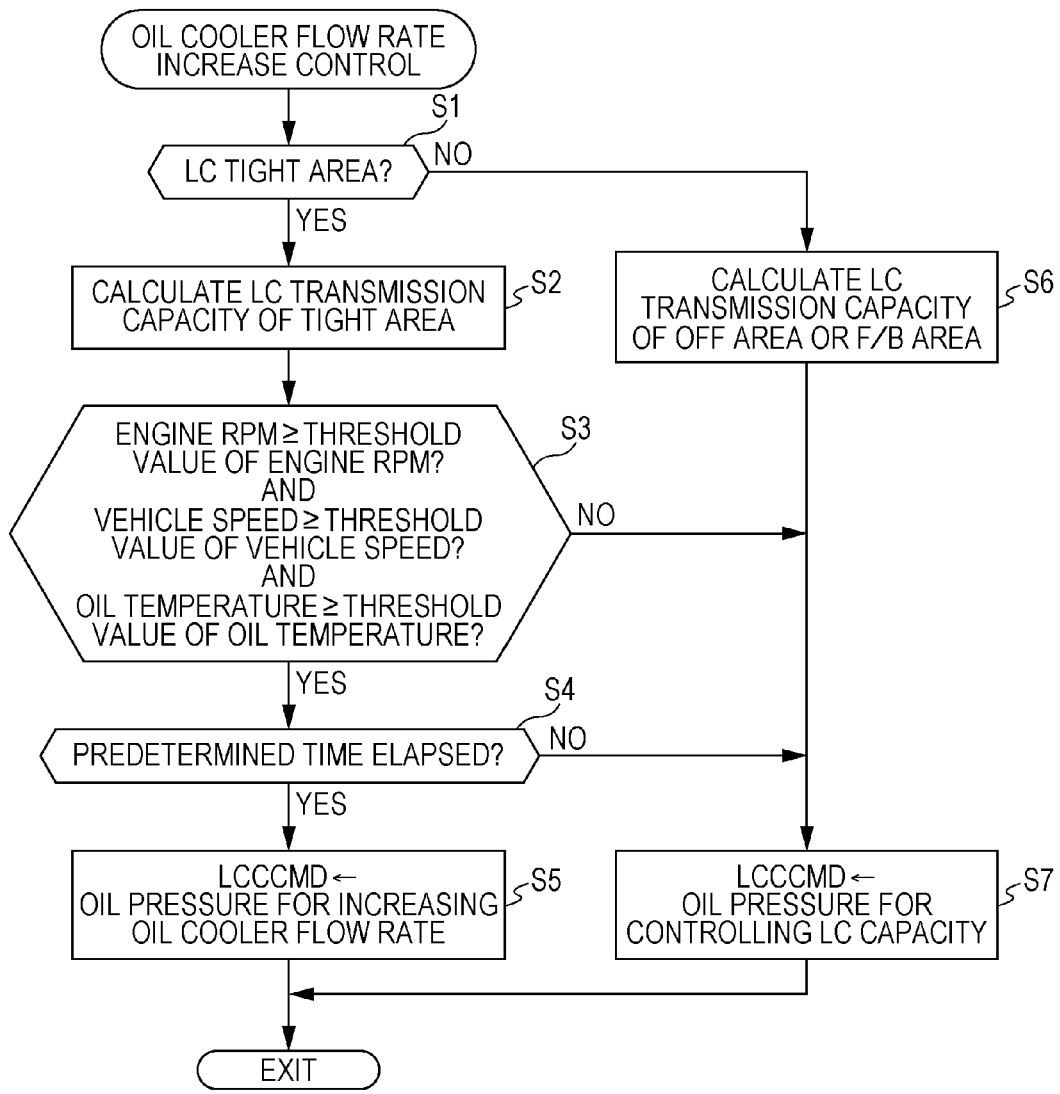
FIG. 3 illustrates a flowchart of a routine for controlling an increase in oil cooler flow rate.
Figure 4:
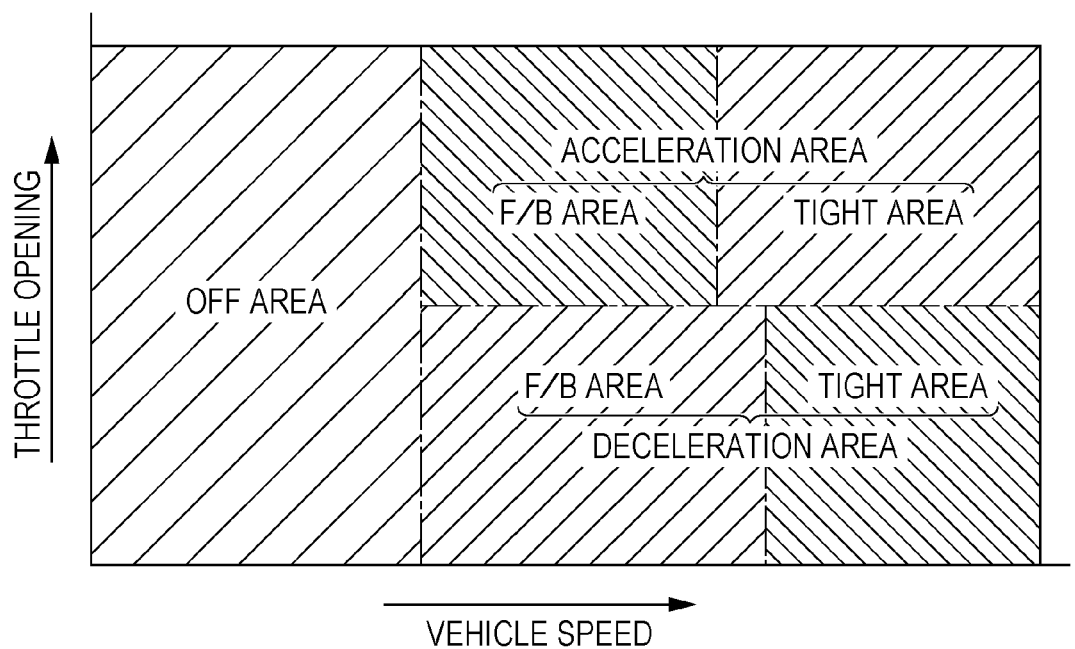
FIG. 4 illustrates a map for determining a control area for a lock-up clutch.

First, in step S1 of the flowchart of FIG. 3, the control area determination unit M1 determines the control area of the lock-up clutch 17. FIG. 4 illustrates a map which determines an engagement area of the lock-up clutch 17 using a vehicle speed detected by the vehicle speed sensor Sa and a throttle opening detected by the throttle position sensor Sb as parameters. The area where the vehicle speed is low is an OFF area of the lock-up clutch 17. In the OFF area, the lock-up clutch 17 is disengaged to increase the torque by the torque converter TC. The sub-area where the vehicle speed is in a middle range in a deceleration area with a low throttle opening is a feedback area. In the feedback area, feedback control is performed so that the lock-up clutch 17 is engaged in a predetermined slip ratio. The area where the vehicle speed is high is a tight area (complete engagement area), in which the lock-up clutch 17 is completely engaged to increase the torque transmission efficiency. The sub-area where the vehicle speed is in a middle range in an acceleration area with a high throttle opening is a feedback area. In the feedback area, feedback control is performed so that the lock-up clutch 17 is engaged in a predetermined slip ratio. The area where the vehicle speed is high is a tight area (complete engagement area), in which the lock-up clutch 17 is completely engaged to increase the torque transmission efficiency. The control in the present disclosure is performed in the tight areas of the deceleration area and the acceleration area.

When the control area of the lock-up clutch 17 is not in the tight areas in step S1, i.e., when the control area is the OFF area or in the feedback areas, the torque transmission capacity calculation unit M2 calculates a torque transmission capacity of the lock-up clutch 17 in step S6, the torque transmission capacity being necessary in the OFF area or the feedback areas. In the OFF region, the torque transmission capacity is zero because the lock-up clutch 17 is disengaged. In the feedback areas, a torque transmission capacity of the lock-up clutch 17 is calculated according to a target slip ratio of the torque converter TC, however, the details are not directly related to the gist of the present disclosure, and thus description thereof is omitted. In step S7, a command value for LCC pressure, LCCCMD to be inputted to the TC regulator valve 34 by the LCC linear solenoid valve 36 is set, so that the lock-up clutch 17 is engaged with the torque transmission capacity calculated in step S6.

On the other hand, when the control area of the lock-up clutch 17 is in the tight areas in step S1, the torque transmission capacity calculation unit M2 calculates a torque transmission capacity of the lock-up clutch 17 in step S2, the torque transmission capacity being necessary in the tight areas. The torque transmission capacity in the tight areas is a minimum required capacity to prevent the lock-up clutch 17 from slipping, and is calculated primarily based on the vehicle speed detected by the vehicle speed sensor Sa, the throttle opening detected by the throttle position sensor Sb, the engine torque calculated from the engine RPM detected by the engine RPM sensor Sc and the intake negative pressure detected by the intake negative pressure sensor Sd, the Input shaft RPM detected by the input shaft RPM sensor Se, and the oil temperature detected by the oil temperature sensor Sf.

Subsequently, in step S3, the high load state determination unit M3 determines whether or not the operational state of a vehicle is in a high load state. That is to say, the high load state determination unit M3 determines that the operational state of a vehicle is in a high load state when the following conditions are satisfied: the engine RPM is higher than or equal to a threshold value (5000 rpm with a hysteresis of 4000 rpm), the vehicle speed is greater than or equal to a threshold value (100 km/h with a hysteresis of 90 km/h), and the oil temperature of the transmission is higher than or equal to a threshold value (100° C. with a hysteresis of 95° C.)

When it is determined that the operational state is not in a high load state in step S3, or otherwise determined and continuous time of a high load state is less than a predetermined time in step S4, the oil pressure control unit M4 sets a command value for LCC pressure, LCCCMD in step S7. On the other hand, when it is determined that the operational state is in a high load state in step S3, and continuous time of a high load state is greater than or equal to a predetermined time in step S4, the oil pressure control unit M4 sets an oil pressure for increase in oil cooler flow rate as the command value for LCC pressure, LCCCMD in step S5, the oil pressure being greater than a certain oil pressure which allows the lock-up clutch 17 to be engaged. As illustrated in FIG. 2A, when the command value for LCC pressure, LCCCMD outputted by the LCC linear solenoid valve 36 is zero, and the LCC pressure is not applied to the port P1 of the TC regulator valve 34, the spool 43 is moved to the right by the TC regulator pressure applied to the port P4, and the port P2 opened by a groove 43b of the spool 43 communicates with the port P3, and thus the oil in the oil passage L3 is discharged through the following path: the port P2→the groove 43b→the port P3→the oil passage L16→the oil passage L5→the mechanism lubrication system 37→the oil passage L6→the oil tank 31. Consequently, the line pressure of the oil passage L3 is significantly reduced, and is outputted to the oil passages L4, L7 as the TC regulator pressure.

When the command value for LCC pressure, LCCCMD outputted by the LCC linear solenoid valve 36 is gradually increased from zero, the LCC pressure applied to the port P1 of the TC regulator valve 34 gradually increases, and the spool 43 is moved to the left. Accordingly, the opening of the port P2 gradually decreases, and the amount of oil discharged to the oil tank 31 decreases, thereby increasing the TC regulator pressure gradually. Therefore, the TC regulator pressure can be freely regulated by gradually increasing the command value for LCC pressure, LCCCMD from zero, the LCCCMD being outputted by the LCC linear solenoid valve 36. When the flow rate of oil which flows through the oil cooler 39 does not need to be particularly increased, the TC regulator valve 34 functions as described above.

On the other hand, when a high load state continues and the oil temperature rises, the command value for LCC pressure, LCCCMD outputted by the LCC linear solenoid valve 36 is set to be a maximum as illustrated in FIG. 2B. Accordingly, the LCC pressure applied to the port P1 of the TC regulator valve 34 is increased to a maximum value, and the spool 43 is moved to the left so as to narrow the communication opening between the port P2 and the port P3. Thus, minimum required oil which has exited from the port P2 and has passed through an aperture 45 of the oil passage L5 is supplied to the mechanism lubrication system 37, and most of the remaining oil is discharged to the oil passages L4, L7, and therefore, the TC regulator pressure is increased to a maximum. The TC regulator pressure at this point exceeds the oil pressure which is necessary for the lock-up clutch 17 to ensure a torque transmission capacity in the tight areas.

In this manner, the oil sent from the TC regulator valve 34 to the oil passages L4, L7 is supplied to the oil cooler 39 through the torque converter TC, and thus the oil temperature can be reduced by increasing the amount of oil which passes through the oil cooler 39 to a maximum.

Figure 6:
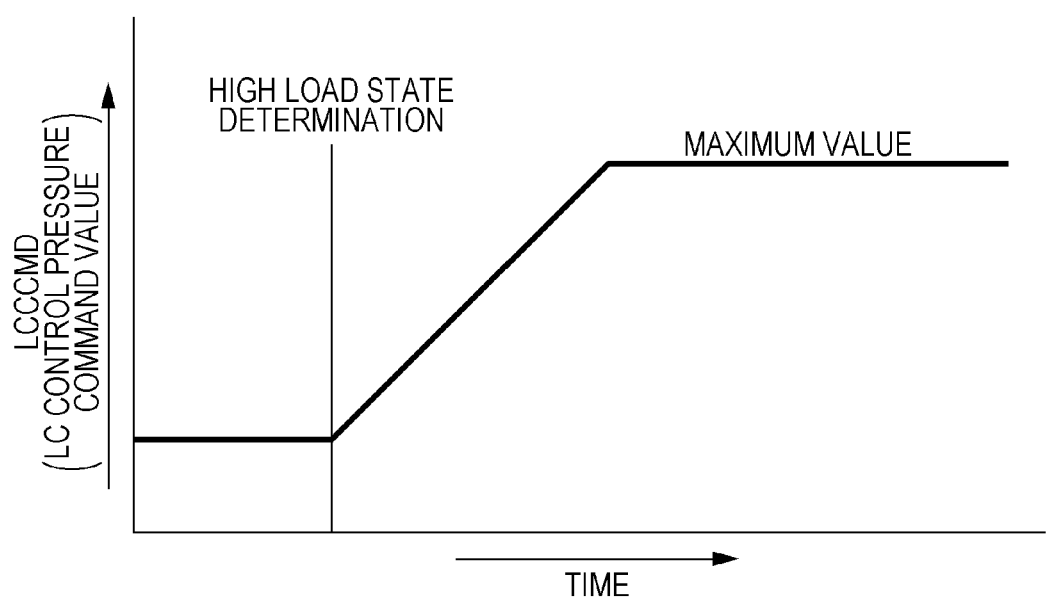
FIG. 6 is a time chart illustrating a change in an LCC pressure at the time of high load state determination.

FIG. 6 is a time chart illustrating the change in the command value for LCC pressure, LCCCMD outputted by the LCC linear solenoid valve 36 when it is determined that the vehicle is in a high load state. An occurrence of shock due to a sudden change in oil pressure can be prevented by gradually increasing the command value LCCCMD to a maximum at a constant rate without a sudden increase.

As described above, according to the present embodiment, when the control area of the lock-up clutch 17 is in the tight areas and a high load state continues for a predetermined time or more, the TC regulator pressure supplied to the torque converter TC is increased to a maximum, and thus the flow rate of returning oil is also increased to a maximum, and therefore, the oil temperature can be efficiently reduced, the returning oil passing the torque converter TC via the oil cooler 39 and being discharged to the oil tank 31. At this point, the control area of the lock-up clutch 17 is in the tight areas, and thus, an increase in the TC regulator pressure supplied to the lock-up clutch 17 causes no problem, and the function of the lock-up clutch 17 is not affected. In addition, the TC regulator valve 34 supplies minimum required oil to the mechanism lubrication system 37 via the aperture 45, thereby causing no degradation in the lubrication performance of the mechanism lubrication system 37.

So far, the embodiment of the present disclosure has been described, however, various design changes can be made without departing from the spirit of the present disclosure.

For example, the automatic transmission of the present disclosure is not limited to the belt-type continuously variable transmission in the embodiment, and may be an automatic transmission with any structure.

In the embodiment, when the control area of the lock-up clutch 17 is in the tight areas and the operational state of a vehicle is in a high load state, the LCC pressure outputted by the LCC linear solenoid valve 36 is set to be a maximum. However, when the LCC pressure is sufficiently high to generate an oil pressure higher than a certain oil pressure necessary for the lock-up clutch 17 to engage completely, the LCC pressure is not necessarily to be a maximum.

Obviously, numerous modifications and variations of the present invention are possible in light of the above teachings. It is therefore to be understood that within the scope of the appended claims, the invention may be practiced otherwise than as specifically described herein.

What is claimed is:

1. An oil pressure control system of an automatic transmission for a vehicle, the oil pressure control system comprising:
    a lock-up clutch provided in a torque converter of the automatic transmission, the torque converter including a first oil chamber and a second oil chamber;
    a torque converter regulator valve to regulate an oil pressure outputted by an oil pump to a torque converter regulator pressure;
    a lock-up clutch control valve to regulate the torque converter regulator pressure to a lock-up clutch pressure;
    a lock-up clutch shift valve to supply the torque converter regulator pressure and the lock-up clutch pressure to the torque converter via a first oil passage and a second oil passage;
    an oil cooler to cool returning oil which is discharged from the second oil chamber via a third oil passage, the lock-up clutch shift valve supplying the torque converter regulator pressure to the first oil chamber via the first oil passage and supplying the returning oil to the oil cooler when the lock-up clutch is disengaged, the lock-up clutch shift valve supplying the lock-up clutch pressure to the first oil chamber via the first oil passage, supplying the torque converter regulator pressure to the second oil chamber via the second oil passage, and supplying the returning oil to the oil cooler when the lock-up clutch slips or is completely engaged;
    a control area determination device configured to determine a control area of the lock-up clutch according to an operational state of the vehicle;
    a torque transmission capacity calculator configured to calculate a reference torque transmission capacity of the lock-up clutch according to the control area determined by the control area determination device;
    a high load state determination device configured to determine that an operational state of the vehicle is in a high load state, the operational state including an oil temperature of the automatic transmission; and
    an oil pressure controller configured to control the torque converter regulator pressure outputted by the torque converter regulator valve, so that a torque transmission capacity of the lock-up clutch is greater than the reference torque transmission capacity calculated by the torque transmission capacity calculator, if the control area determined by the control area determination device is a complete engagement area and the high load state determination device determines that the operational state is in the high load state.

2. The oil pressure control system according to claim 1, wherein the control area determination device is configured to determine the control area based on a vehicle speed and a throttle opening.

3. The oil pressure control system according to claim 1, wherein the high load state determination device determines that the operational state of the vehicle is in the high load state if a rotational speed of an engine of the vehicle is higher than or equal to a first threshold value, if a vehicle speed is greater than or equal to a second threshold value, and the oil temperature of the automatic transmission is higher than or equal to a third threshold value.

4. The oil pressure control system according to claim 1, wherein the oil pressure controller controls the torque converter regulator pressure outputted by the torque converter regulator valve, so that the torque transmission capacity of the lock-up clutch is greater than the reference torque transmission capacity calculated by the torque transmission capacity calculator, if the control area determined by the control area determination device is the complete engagement area and the high load state determination device determines that a continuous time of the high load state is greater than or equal to a predetermined time.

* * * * *